(12) United States Patent
Milton et al.

(10) Patent No.: US 10,589,788 B1
(45) Date of Patent: Mar. 17, 2020

(54) VEHICLE FRAME ARRANGEMENT

(71) Applicant: NIKOLA MOTOR COMPANY LLC, Phoenix, AZ (US)

(72) Inventors: Trevor R. Milton, Phoenix, AZ (US); Kevin M. Lynk, Phoenix, AZ (US)

(73) Assignee: NIKOLA MOTOR COMPANY LLC, Phoenix, AZ (US)

( * ) Notice: Subject to any disclaimer, the term of this patent is extended or adjusted under 35 U.S.C. 154(b) by 0 days.

(21) Appl. No.: 16/260,836

(22) Filed: Jan. 29, 2019

(51) Int. Cl.
*B62D 21/02* (2006.01)
*B60R 16/04* (2006.01)

(52) U.S. Cl.
CPC .............. *B62D 21/02* (2013.01); *B60R 16/04* (2013.01)

(58) Field of Classification Search
CPC ................................ B62D 21/02; B60R 16/04
See application file for complete search history.

(56) References Cited

U.S. PATENT DOCUMENTS

| 7,237,644 | B2 * | 7/2007 | Matsumoto | ............ B60K 13/04 180/309 |
| 2017/0282709 | A1 * | 10/2017 | Sasaki | .............. B60K 15/03006 |
| 2017/0320382 | A1 | 11/2017 | Milton et al. | |

FOREIGN PATENT DOCUMENTS

| CN | 2647706 Y | 10/2004 |
| CN | 105438262 A | 3/2016 |
| DE | 10 2006 009 189 B3 | 7/2007 |

* cited by examiner

*Primary Examiner* — Bryan A Evans
(74) *Attorney, Agent, or Firm* — Brooks Kushman P.C.

(57) ABSTRACT

A frame arrangement for a vehicle may include first and second longitudinally extending side members that each have an upper portion and a lower portion. The upper portions are spaced laterally apart by a first distance, and the lower portions are spaced laterally apart by a second distance less than the first distance. The frame arrangement may further include at least one storage tank or battery positioned between the side members.

20 Claims, 8 Drawing Sheets

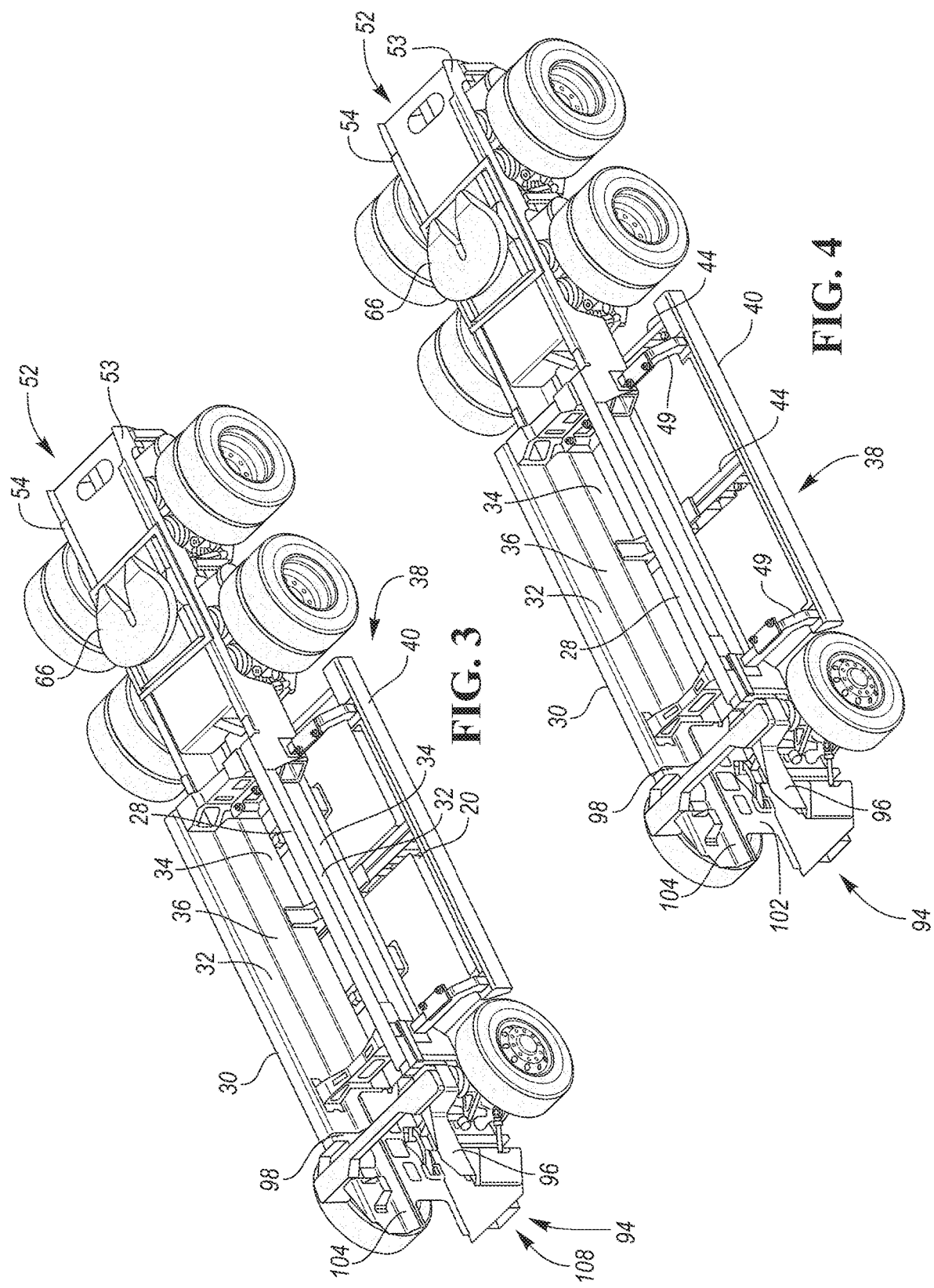

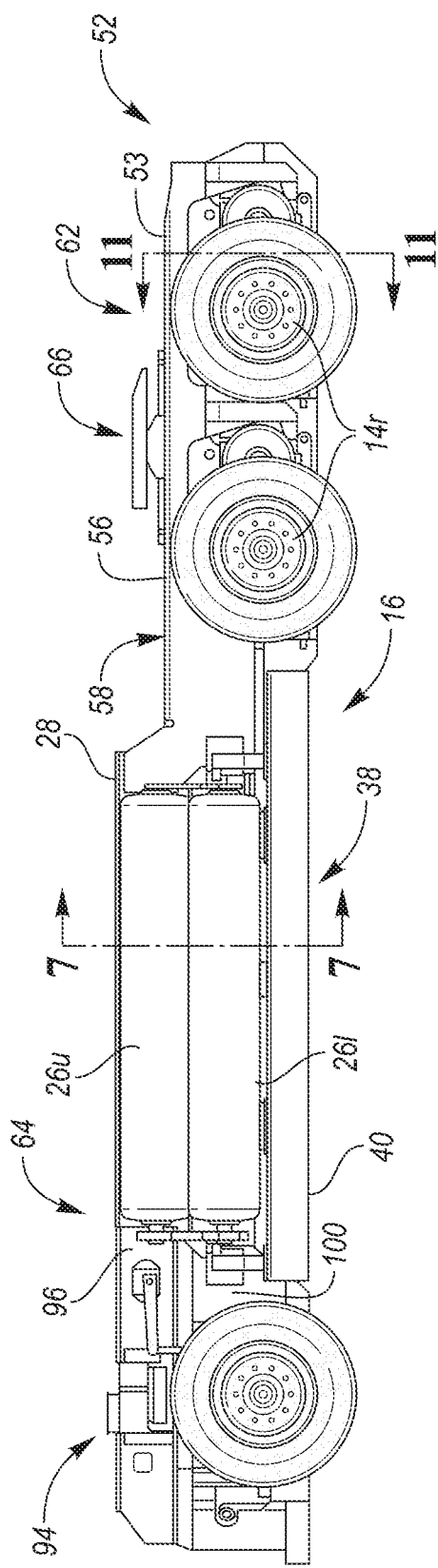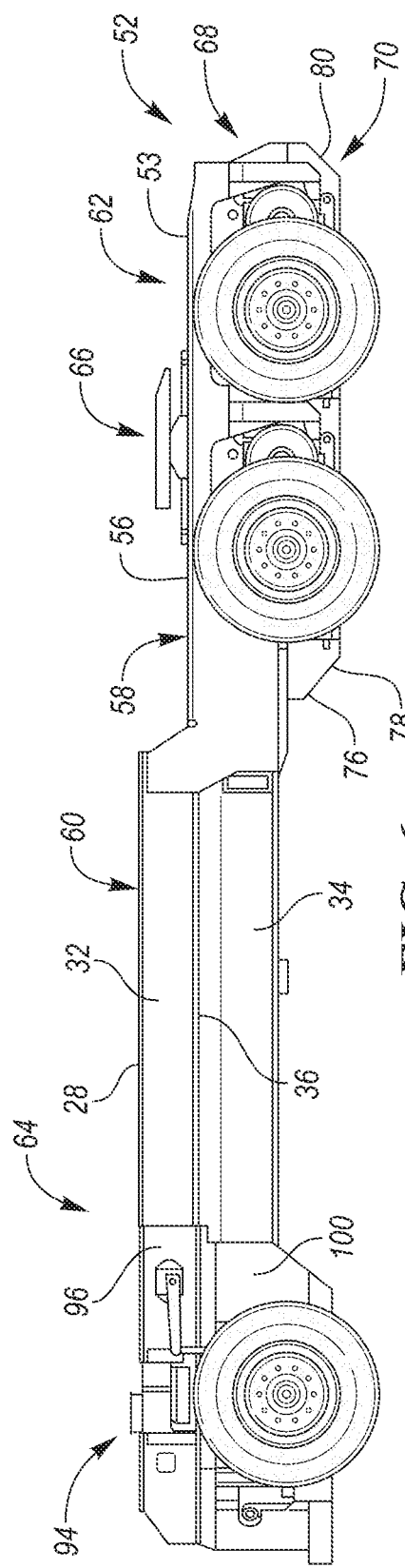

VEHICLE FRAME ARRANGEMENT

TECHNICAL FIELD

The disclosure relates to frame arrangements for use with vehicles.

BACKGROUND

A motor vehicle may be provided with a support arrangement or frame arrangement for supporting various components. An example frame arrangement is disclosed in German patent DE 102006009189 B3.

SUMMARY

A frame arrangement according to the disclosure is provided for use with a vehicle. The frame arrangement may include first and second longitudinally extending side members that each have an upper portion and a lower portion. The upper portions are spaced laterally apart by a first distance, and the lower portions are spaced laterally apart by a second distance less than the first distance. The frame arrangement may further include at least one storage tank or battery positioned between the side members.

In at least one embodiment according to the disclosure, a frame arrangement for a vehicle includes first and second longitudinally extending bent side members that each have an upper portion, an offset lower portion and an angled connector portion that connects the upper portion to the lower portion. The upper portions are spaced laterally apart by a first distance, and the lower portions are spaced laterally apart by a second distance less than the first distance. The frame arrangement further includes multiple storage tanks positioned between the side members. The multiple storage tanks include first and second upper tanks positioned between the upper portions of the side members, and a lower tank positioned between the lower portions of the side members. In addition, the frame arrangement includes a lower support structure attached to the side members and extending below the side members, and at least one battery positioned below the at least one storage tank and supported by the lower support structure.

While exemplary embodiments are illustrated and disclosed, such disclosure should not be construed to limit the claims. It is anticipated that various modifications and alternative designs may be made without departing from the scope of the disclosure.

BRIEF DESCRIPTION OF THE DRAWINGS

FIG. 3 is a perspective view of the frame arrangement with the storage tanks removed to show additional details of the lower support structure and battery packs;

FIG. 4 is a perspective view of the frame arrangement with the battery packs removed;

FIG. 5 is a side view of the frame arrangement showing multiple storage tanks positioned on an outboard side of one of the side members, and showing the lower support structure positioned beneath the storage tanks;

FIG. 6 is a side view similar to FIG. 5 with the storage tanks and lower support structure removed to show additional details of the side members;

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
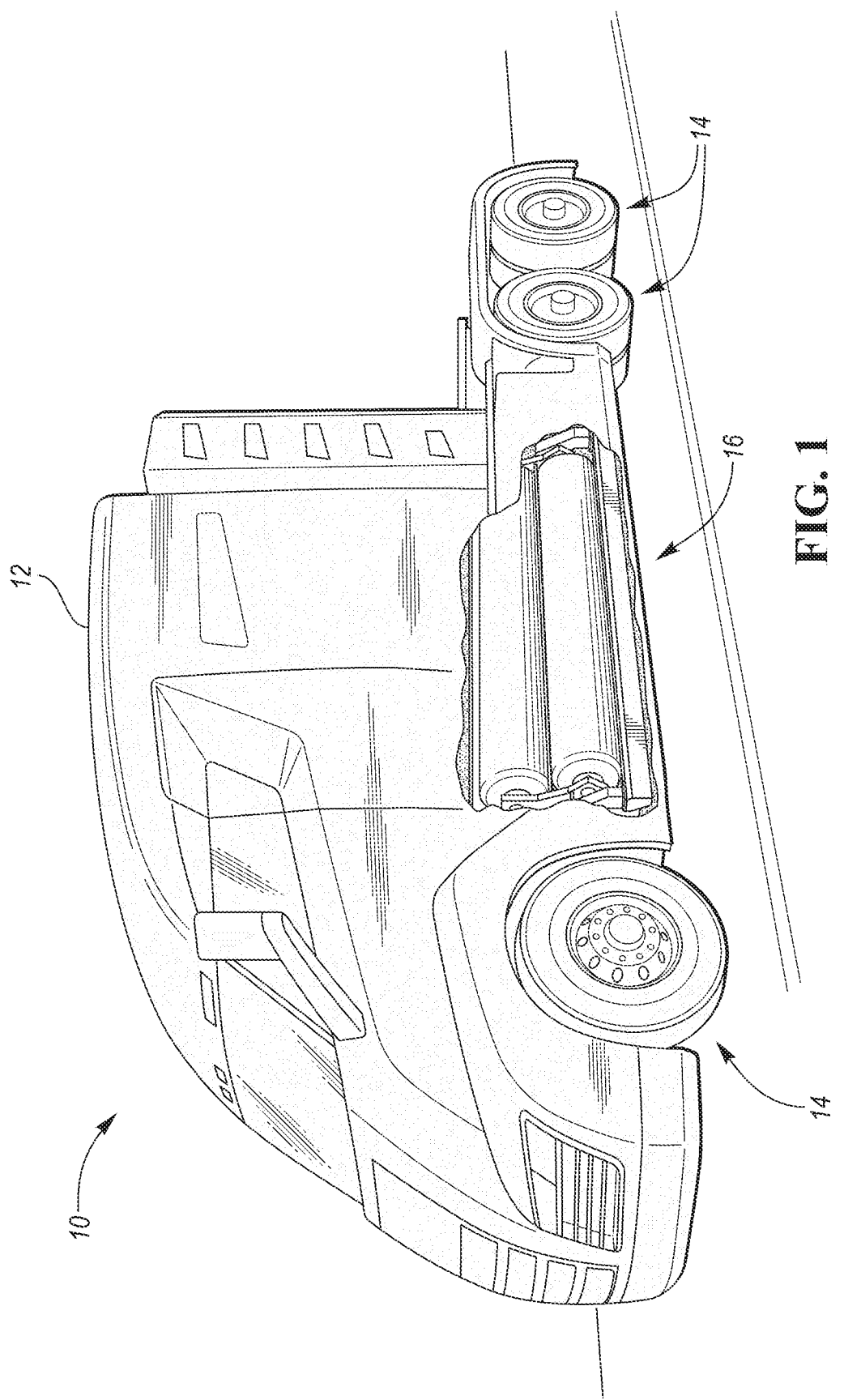
FIG. 1 is a perspective view of a vehicle including a cab and multiple wheels supported by a frame arrangement according to the present disclosure.

A vehicle according to the present disclosure may be any suitable vehicle, such as a passenger car, truck, etc. FIG. 1 shows an exemplary vehicle, which is a class 8 semi-truck 10. The truck 10 may have an aerodynamic cab 12 and any suitable number of rotatable wheels 14 that are supported by a frame arrangement 16 according to the present disclosure. In the embodiment shown in FIG. 1, the four rear wheels 14 each include a dual wheel pair (two wheels that rotate together). Furthermore, one or more of the wheels 14 and associated tires 17 may be driven by any suitable powertrain or drive system. For example, each rear wheel 14 may be connected to an electric motor and associated gear train. As a more specific example, motors and gear trains may be grouped in pairs to form a motor gearbox assembly 18 (shown best in FIG. 11) for driving rear wheels 14 on opposite sides of the vehicle 10. Further details of such a drive system are disclosed in U.S. patent application Ser. No. 15/357,350, which is hereby incorporated by reference in its entirety. As another example, two or more of the wheels 14 may be connected to a single electric motor or other drive system.

Figure 2:
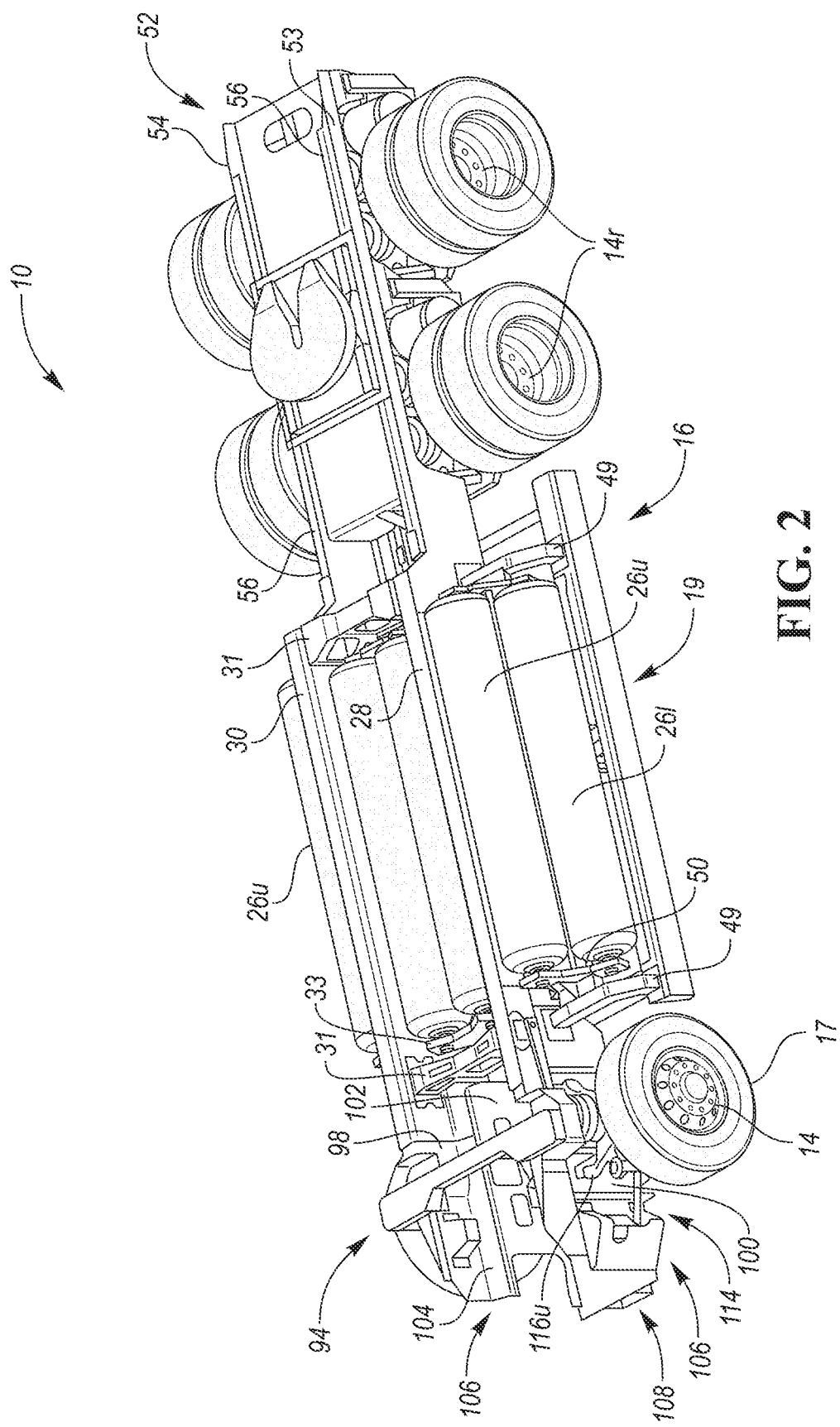
FIG. 2 is a perspective view of the frame arrangement including first and second side members, multiple storage tanks positioned between the side members, and a lower support structure that houses multiple battery packs positioned beneath the side members.
Figure 7A:
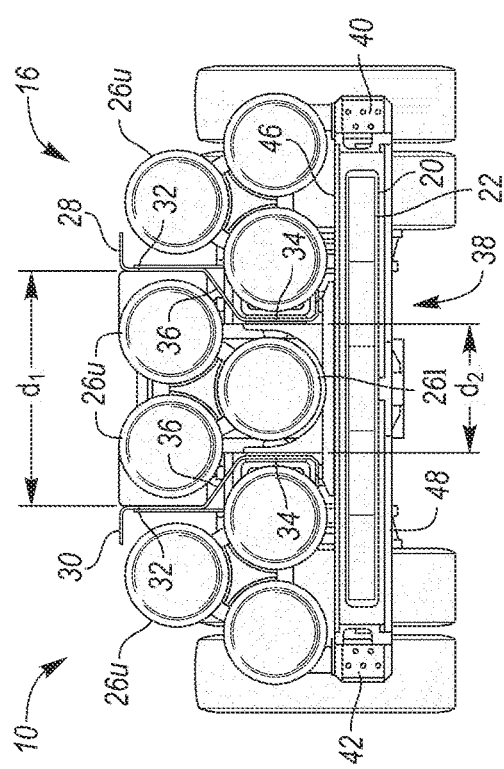
FIG. 7A is a cross-sectional view of the frame arrangement, taken along line 7-7 in FIG. 5 and viewed in the direction of the arrows, showing multiple storage tanks positioned between the side members, and multiple storage tanks positioned on an outboard side of each side member.
Figure 7B:
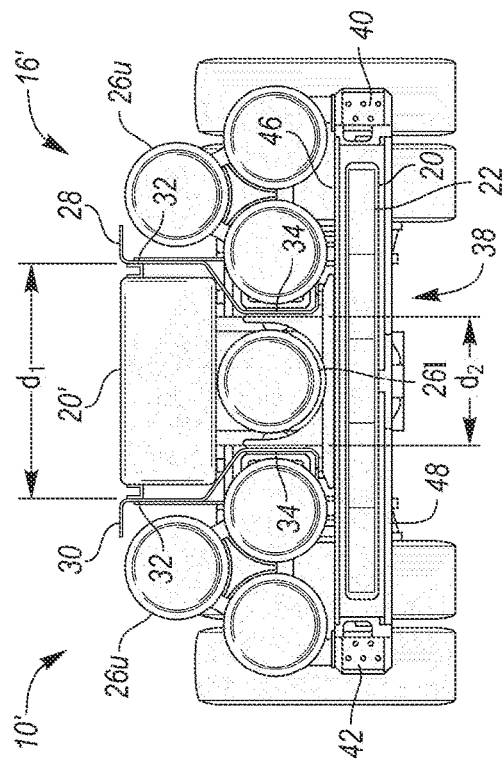
FIG. 7B is a cross-sectional view similar to FIG. 7A showing another embodiment of the frame arrangement that includes a battery pack and a storage tank positioned between the side members, and multiple storage tanks positioned on an outboard side of each side member.
Figure 7C:
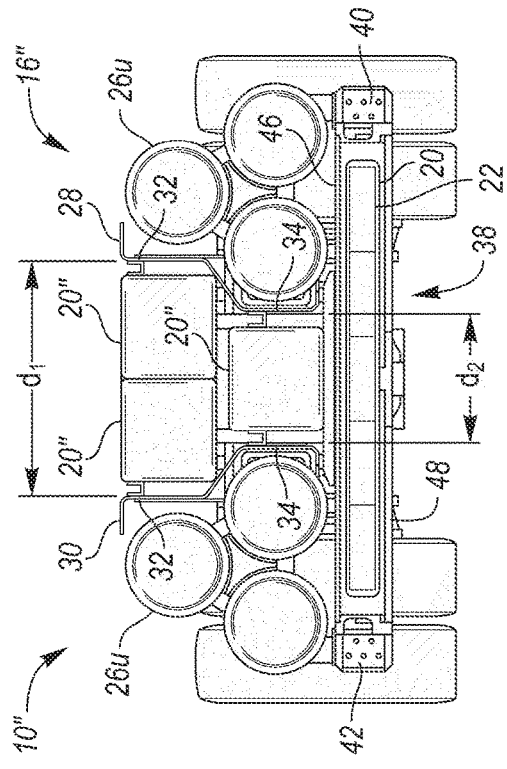
FIG. 7C is a cross-sectional view similar to FIG. 7A showing yet another embodiment of the frame arrangement that includes three battery packs arranged in a triangular configuration between the side members, and multiple storage tanks positioned on an outboard side of each side member.
Figure 7D:
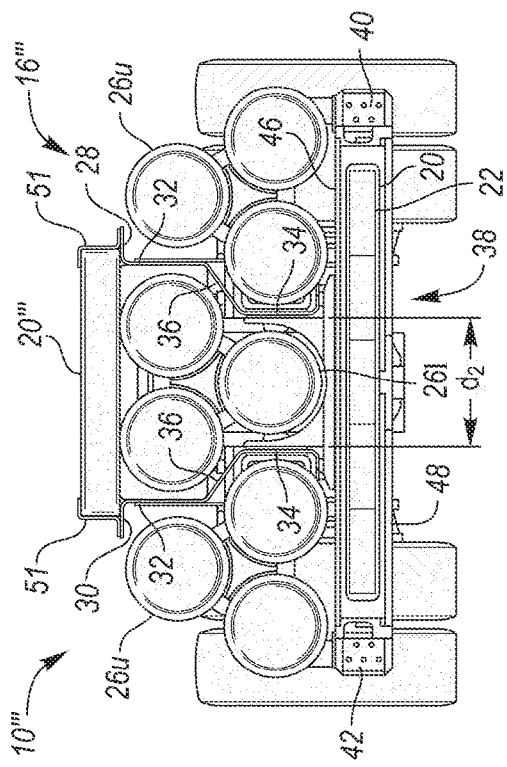
FIG. 7D is a cross-sectional view similar to FIG. 7A showing still yet another embodiment of the frame arrangement that includes a battery pack positioned above the side members.
Figure 8:
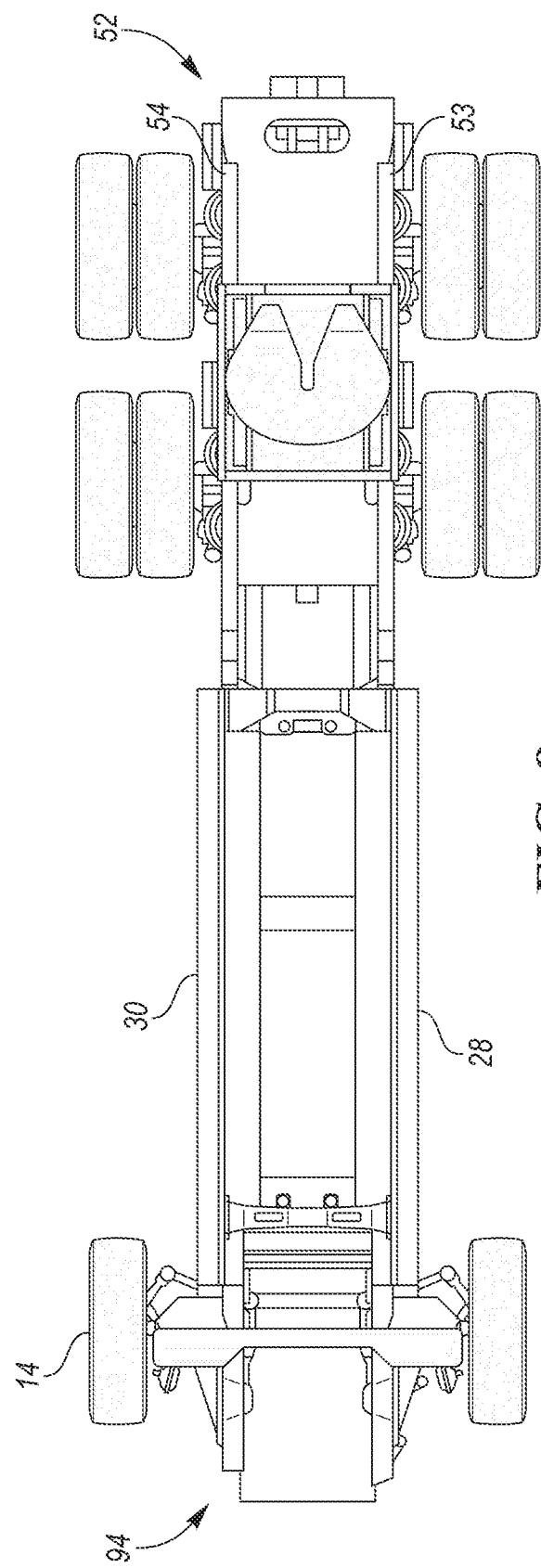
FIG. 8 is a top view of the frame arrangement with the storage tanks and lower support structure removed.

Referring to FIGS. 2-3 and 7A, if the vehicle 10 includes one or more electric motors, the electric motors may be powered by any suitable energy supply system (ESS) 19, such as a hydrogen fuel cell or one or more batteries. In the embodiment shown in FIGS. 2-3 and 7A, the vehicle 10 includes one or more rechargeable battery packs 20 that each have one or more batteries 22 that may be charged in any suitable manner. For example, the ESS 19 may be charged by a fuel cell or an onboard turbine of a turbine assembly (not shown). The fuel cell or turbine may automatically charge the batteries of the ESS 19 when needed and eliminate the need to ever "plug-in." Furthermore, the fuel cell or turbine may be fueled by fuel stored in one or more storage tanks 26. For example, the storage tanks 26 may store natural gas or hydrogen (e.g., liquid hydrogen).

Referring to FIGS. 2-7A, the frame arrangement 16 includes frame members that are configured to provide significant strength and support for the vehicle 10, while also providing a targeted storage area or areas for at least one storage tank 26 or battery 22, which may also be considered part of the frame arrangement 16. In the illustrated embodiment, the frame arrangement 16 includes first and second longitudinally extending side members or beams 28 and 30, respectively, that may be connected together by one or more lateral supports 31. Furthermore, each side number 28, 30 has an upper longitudinally extending portion 32, such as an upright or vertical wall, and an offset lower longitudinally extending portion 34, such as an upright or vertical wall. Each side member 28, 30 also has a connector portion, such as an angled or flat connector portion 36, that connects the upper portion 32 to the lower portion 34. Referring to FIG. 7A, the upper portions are spaced laterally apart by a first distance $d_1$, and the lower portions are spaced laterally apart by a second distance $d_2$ less than the first distance. For example, the second distance $d_2$ may be less than 75%, 60% or 50% of the first distance $d_1$. In one embodiment, the first distance $d_1$, may be in the range of 75 to 125 cm, and the second distance $d_2$ may be in the range of 35 to 75 cm. In another embodiment, the first distance $d_1$, may be in the range of 80 to 105 cm, and the second distance $d_2$ may be in the range of 45 to 60 cm. In yet another embodiment, the first distance $d_1$, may be 92 cm, and the second distance $d_2$ may be 52.5 cm.

Furthermore, at least one storage tank 26 or battery 22 is positioned between the side members 28, 30. In the embodiment shown in FIG. 7A, three elongated, cylindrical storage tanks 26 are positioned between the side members 28, 30. Those storage tanks 26 include first and second upper storage tanks 26*u* positioned between the upper portions 32 of the side members 28, 30, and a lower storage tank 26*l* positioned between the lower portions 34 of the side members 28, 30 and extending below the upper storage tanks 26*u*. Furthermore, the upper storage tanks 26*u* and the lower storage tank 26*l* form a triangular configuration viewed in cross-section. Returning to FIG. 2, the storage tanks 26 positioned between the side members 28, 30 may be connected to the lateral supports 31 with brackets 33, for example.

In the embodiment shown in FIGS. 2, 5 and 7A, the frame arrangement 16 further includes multiple storage tanks 26, such as elongated, cylindrical storage tanks, positioned on an outboard side of the first side member 28, and multiple storage tanks 26 positioned on an outboard side of the second side member 30. For example, the multiple storage tanks 26 positioned on the outboard side of each of the first and second side members 28 and 30, respectively, may include first and second lower storage tanks 26*l* and an upper storage tank 26*u* that extends above the lower storage tanks 26*l* so that the first and second lower storage tanks 26*l* and the upper storage tank 26*u* form a triangular configuration viewed in cross-section.

With the above configuration of the frame arrangement 16, the storage tanks 26 may be efficiently arranged relative to the side members 28, 30. Furthermore, for storage tanks 26 having relatively small diameters, such as high-pressure hydrogen storage tanks having an outer diameter in the range of 25 to 60 cm (e.g., 40 cm), the quantity of storage tanks 26 may be maximized.

Referring to FIGS. 3, 4 and 7A, the frame arrangement 16 may further include a lower support structure 38 attached to the side members 28, 30 and extending below the side members 28, 30, and at least one battery 22 supported by the lower support structure 38. In the illustrated embodiment, the frame arrangement 16 includes two battery packs 20 attached to the lower support structure 38, and each battery pack 20 includes multiple batteries 22. Furthermore, the lower support structure 38 includes first and second elongated side members or beams 40 and 42, respectively, and multiple laterally extending members or beams 44 connected to the side beams 40, 42 and that cooperate with the side beams 40, 42 to form two receptacles for receiving the battery packs 20. In addition, the lower support structure 38 includes two upper plates 46 connected to the side beams 40, 42 and/or lateral beams 44, and a lower plate 48 spaced away from the upper plates 46 and connected to the side beams 40, 42 and/or lateral beams 44. Each battery pack 20 is positioned between a respective upper plate 46 and the lower plate 48, and may be connected to one of the side beams 40, 42 and/or one or more of the lateral beams 44 in any suitable manner, such as with one or more brackets. The lower support structure 38 may also include multiple connector members 49 for connecting the side beams 40, 42 directly or indirectly to the side members 28, 30. Furthermore, the storage tanks 26 positioned on the outboard sides of the side members 28, 30 may be attached to one of the connector members 49, such as with a bracket 50.

In another embodiment, the frame arrangement may include one or more batteries positioned between the side members 28, 30 and/or on an outboard side of one or both of the side members 28, 30. In the embodiment shown in FIG. 7B, for example, frame arrangement 16' includes a battery pack 20' positioned between the upper portions 32 of the side members 28, 30 and above storage tank 26*l*, and the battery pack 20' includes one or more batteries. In the embodiment shown in FIG. 7C, frame arrangement 16" includes three battery packs 20" arranged in a triangular configuration between the side members 28, 30, and each battery pack 20" includes one or more batteries. As another option, the upper two battery packs 20" shown in FIG. 7C may be formed as a single battery pack having one or more batteries. In yet another embodiment, the frame arrangement may include one or more batteries positioned above the side members 28, 30. For example, in the embodiment shown in FIG. 7D, frame arrangement 16''' includes one or more brackets 51 attached to an upper flange of one or both side members 28, 30, and one or more battery packs 20''', which each include one or more batteries, attached to one or more of the brackets 51 so that the batteries extend above the side members 28, 30. In any of the embodiments shown in FIGS. 7B-7D, the lower support structure 38 and associated battery packs 20 may be omitted if not needed.

Referring to FIGS. 2-6 and 8, the side members 28, 30 may be positioned or extend forward of rear wheels 14r of the vehicle 10, and the frame arrangement 16 may further include a rear section 52 that extends rearwardly of the side members 28, 30. In the illustrated embodiment, the rear section 52 includes first and second longitudinally extending rear members or beams 53 and 54, respectively, attached to the first and second side members 28 and 30, respectively. Referring to FIGS. 5 and 6, each rear member 53, 54 may include a main body 56 having a top surface 58 that is positioned beneath a top surface 60 of each side member 28, 30 so that a height of a rear portion 62 of the frame arrangement 16 is lower than a height of a front portion 64 of the frame arrangement 16. For example, the height of the rear portion 62 may be in the range of 2 to 50 cm lower than the height of the front portion 64. Furthermore, the height of the rear portion 62 from the ground may be in the range of 90 to 110 cm (e.g., 102 cm), and the height of the front portion 64 from the ground may be in the range of 92 to 160 cm (e.g., 129 cm). With the above configuration, space for storage tanks 26 and/or batteries 22 may be maximized in a central portion of the frame arrangement 16, while also providing a lowered rear portion 62 to facilitate connection of the frame arrangement 16 to a trailer (not shown) using a trailer coupling 66, for example.

Referring to FIGS. 6 and 9-11, the rear section 52 may further include an intermediate support structure 68 connected to the rear members 53, 54, and a lower support structure 70 connected to the intermediate support structure 68. The intermediate support structure 68 includes a longitudinally extending upper central support member or beam 72 (shown best in FIGS. 9 and 11), and one or more laterally extending members 74 that connect the upper central support member 72 to the rear members 53, 54 and/or the side members 28, 30. The lower support structure 70 includes a longitudinally extending lower central support member or beam 76 that is connected to the upper central support member 72 and/or the laterally extending members 74 of the intermediate support structure 68. In the illustrated embodiment, the lower central support member 76 includes angled front and rear portions 78 and 80, respectively, that are connected to the upper central support member 72 and/or the laterally extending members 74 of the intermediate support structure 68. The lower support structure 70 further includes a lower plate 82 that may provide protection to various components located at the rear of vehicle 10. The lower plate 82 may be integrally formed as part of the lower central support member 76, or it may be a separate member attached to the lower central support member 76.

Figure 10:
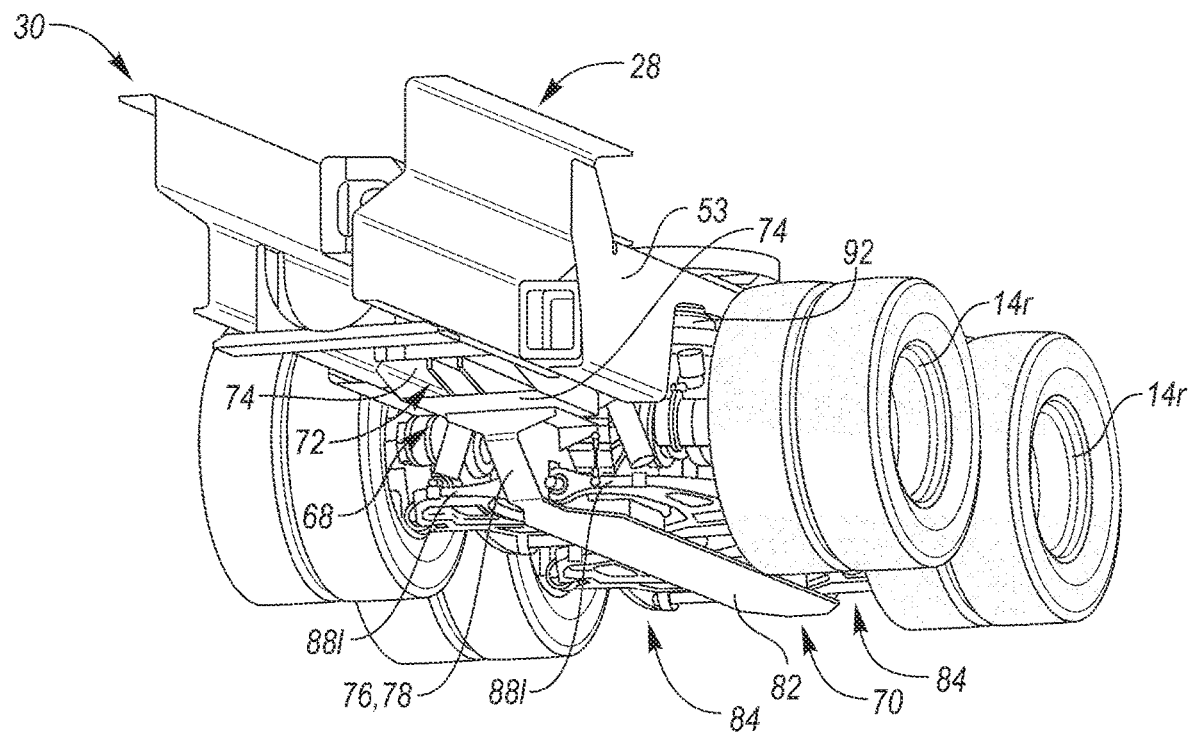
FIG. 10 is a fragmentary rear perspective view of the frame arrangement.
Figure 11:
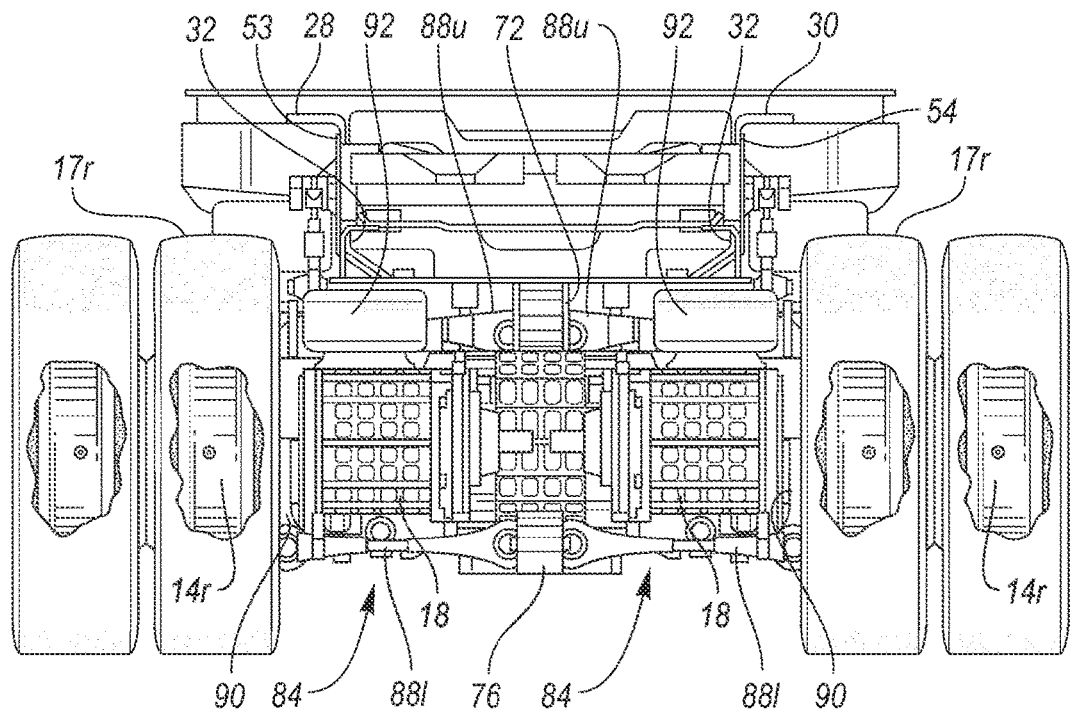
FIG. 11 is a cross-sectional view taken approximately along line 11-11 of FIG. 5 and viewed in the direction of the arrows.

Referring to FIGS. 10 and 11, the frame arrangement 16 may also include multiple rear suspension systems 84, such as a driver side rear suspension system and a passenger side rear suspension system. In the embodiment shown in FIG. 10, the frame arrangement 16 includes a rear suspension system 84 for each dual wheel pair 14r. Furthermore, each rear suspension system 84 includes at least one control arm 88 connected to a central support member 72, 76 of the rear section 52. In the embodiment shown in FIGS. 10 and 11, each suspension system 84 includes an upper control arm 88u having one or more inboard ends (e.g., two inboard ends) pivotally connected to the upper central support member 72, and a lower control arm 88l having one or more inboard ends (e.g., two inboard ends) pivotally connected to the lower central support member 76. With such a configuration, pivotal connection points for the inboard ends of the control arms 88u, 88l may be positioned proximate a center of the vehicle 10, which may result in better tracking of rear tires 17r since they may remain more vertical during suspension travel. Furthermore, an outboard end of each control arm 88u, 88l may be connected to a respective knuckle 90 that supports a respective rear wheel 14r.

Each rear suspension system 84 further includes one or more spring members 92, such as air springs, that are each supported by a respective knuckle 90, and that are positioned outwardly of the inboard ends of the respective control arms 88. In the embodiment shown in FIG. 11, each spring member 92 extends at least partially outwardly of an upper portion 32 (e.g., vertical wall) of a respective side member 28, 30. With the above configuration in which each spring member 92 is positioned beneath a respective side member 28, 30 and proximate a respective rear wheel 14r, ride stability of the vehicle 10 may be improved since loads may be transmitted efficiently and effectively through the frame arrangement 16.

Referring to FIGS. 2-6, the frame arrangement 16 may further include a front section 94 connected to the side members 28, 30 and that extends forward of the side members 28, 30. In the illustrated embodiment, the front section 94 includes first and second upper side walls 96 and 98, respectively, that are connected to the upper portions 32 of the first and second side members 28 and 30, respectively, and first and second lower side walls 100 and 102, respectively, that are offset inwardly relative to the first and second upper side walls 96 and 98, respectively. Each upper side wall 96, 98 may be connected to a respective lower side wall 100, 102 with an intermediate wall 104, which may be a flat or angled wall, for example. Furthermore, each upper side wall 96, 98 may be integrally formed as a single piece with a respective lower side wall 100, 102 and a respective intermediate wall 104. Whether formed together as a single piece or multiple pieces connected together, each upper side wall 96, 98 and corresponding lower side wall 100, 102 and intermediate wall 104 may together form a front side member 106.

Figure 9:
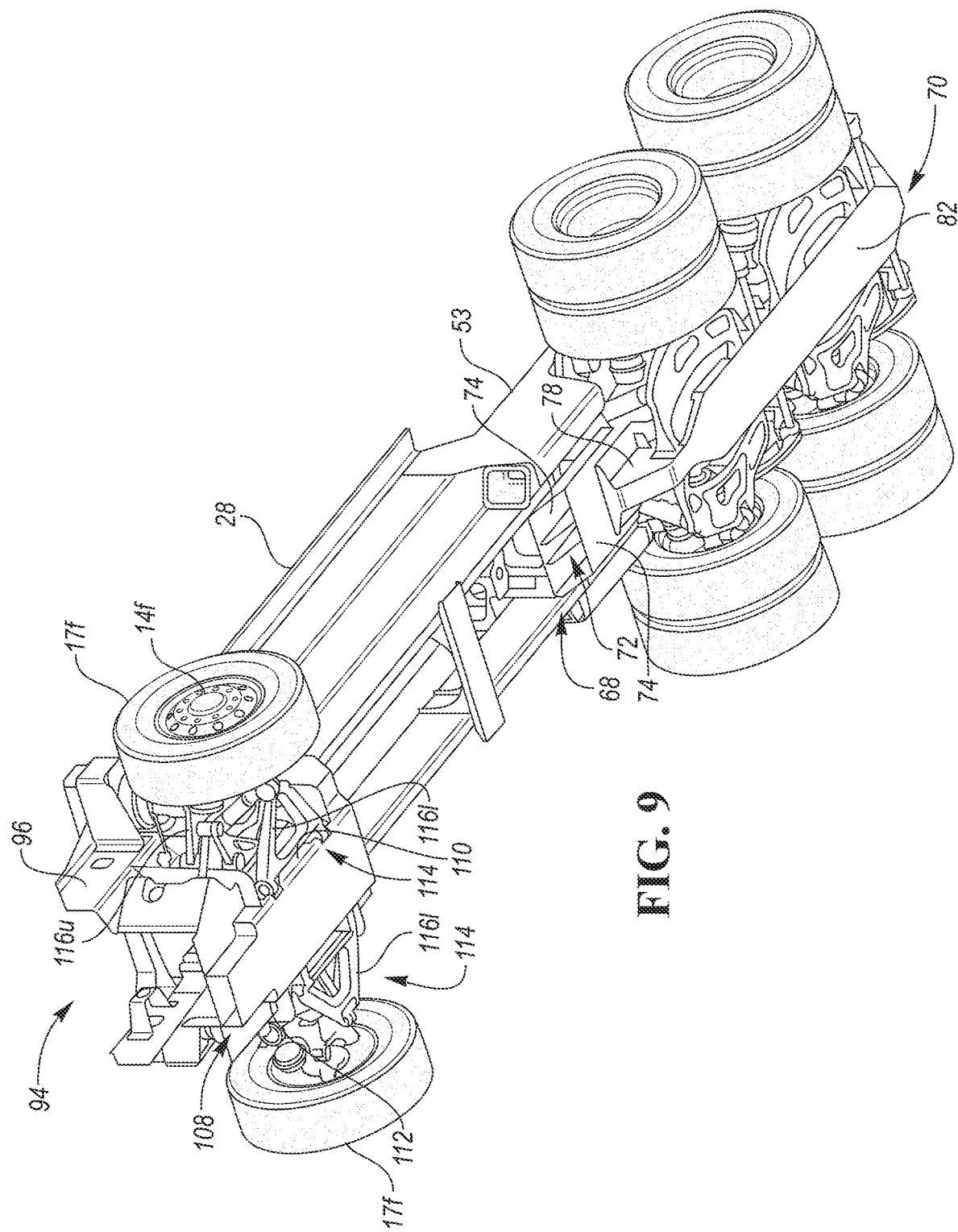
FIG. 9 is a perspective bottom view of the frame arrangement with the storage tanks and lower support structure removed.

As shown in FIGS. 2 and 9, the front section 94 may also include a lower support structure 108 connected to the front side members 106. The lower support structure 108 may include first and second side walls 110 and 112, respectively, that are spaced inwardly from the first and second lower side walls 100 and 102, respectively.

In addition, the frame arrangement 16 may include multiple front suspension systems 114, such as a driver side front suspension system and a passenger side front suspension system. Furthermore, each suspension system 114 may include at least one control arm 116 connected to a respective lower side wall 100, 102 of the front section 94. For example, each suspension system 114 may include an upper control arm 116u that has one more inboard ends (e.g., two inboard ends) pivotally connected to a respective lower side wall 100, 102 of the front section 94. In the embodiment shown in FIGS. 2 and 9, each suspension system 114 further includes a lower control arm 116l having one more inboard ends (e.g., two inboard ends) pivotally connected to a respective sidewall 110, 112 of the lower support structure 108. In another embodiment, each lower control arm 116l may have one or more inboard ends pivotally connected to a respective lower side wall 100, 102 of the front section 94. With such a configuration, pivotal connection points for the inboard ends of the control arms 116u, 116l may be positioned proximate a center of the vehicle 10, which may result in better tracking of the front tires 17f since they may remain more vertical during suspension travel. Furthermore, an outboard end of each control arm 116u and 116l may be connected to a respective knuckle that supports a respective front wheel 14f.

The components of the frame arrangement 16 may be made of any suitable material and in any suitable manner. For example, each side member 28, 30, each rear member 53, 54 and each front side member 106 may be made of any suitable material, such as metal (e.g., aluminum or steel), composite material (e.g., carbon fiber reinforced polymer), etc., that is bent, stamped or molded into a desired shape. Furthermore, each side member 28, 30 may have a stepped configuration viewed in cross-section so that the upper portions 32 are spaced farther away from each other than the lower portions 34. Such a triangular configuration may function to lower and centralize the center of gravity of the vehicle 10. The stepped configuration also provides added strength to each side member 28, 30. In addition, the stepped configuration of each side member 28, 30 may be specifically designed to be compatible with the above mentioned triangular configurations of the storage tanks 26.

Each side number 28, 30, each rear member 53, 54 and each front side member 106 may be a solid structure, or may be formed with holes or openings to reduce weight.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A frame arrangement for a vehicle, the frame arrangement comprising:
   first and second longitudinally extending side members that each have an upper portion and a lower portion, wherein the upper portions are spaced laterally apart by a first distance, and the lower portions are spaced laterally apart by a second distance less than the first distance; and
   multiple storage tanks positioned between the side members, wherein the multiple storage tanks comprise first and second cylindrical upper tanks positioned between the upper portions of the side members, and a cylindrical lower tank that extends below the upper tanks, and wherein the upper tanks and the lower tank form a triangular configuration viewed in cross-section.

2. The frame arrangement of claim 1 further comprising multiple storage tanks positioned on an outboard side of the first side member and multiple storage tanks positioned on an outboard side of the second side member.

3. The frame arrangement of claim 2 wherein the multiple storage tanks positioned on the outboard side of each of the first and second side members comprise first and second lower storage tanks and an upper storage tank that extends above the first and second lower storage tanks so that the first and second lower storage tanks and the upper storage tank form a triangular configuration viewed in cross-section.

4. The frame arrangement of claim 1 further comprising a lower support structure attached to the side members and extending below the side members, and at least one battery supported by the lower support structure.

5. The frame arrangement of claim 1 wherein the side members are bent or stamped.

6. The frame arrangement of claim 1 wherein the side members each have a stepped configuration viewed in cross-section.

7. The frame arrangement of claim 1 wherein the side members comprise a composite material.

8. The frame arrangement of claim 7 wherein the composite material comprises carbon fibers.

9. The frame arrangement of claim 1 wherein the side members are configured to extend forward of rear wheels of the vehicle when the frame arrangement is used with the vehicle, and wherein the frame arrangement further comprises first and second longitudinally extending rear members attached to the first and second side members, respectively, each rear member including a main body having a top surface that is positioned beneath a top surface of each side member so that height of a rear portion of the frame arrangement is lower than height of a front portion of the frame arrangement to thereby facilitate connection of the frame arrangement to a trailer.

10. The frame arrangement of claim 1 further comprising a rear section connected to the side members and that extends rearward of the side members, the rear section including longitudinally extending upper and lower central support members, and wherein the frame arrangement further comprises first and second suspension systems that each include at least one control arm having an inboard end connected to one of the central support members.

11. The frame arrangement of claim 1 further comprising a front section connected to the side members and that extends forward of the side members, the front section including first and second upper side walls that are connected to the upper portions of the first and second side members, respectively, and first and second lower side walls that are offset inwardly relative to the first and second upper side walls, respectively, and wherein the frame arrangement further comprises first and second suspension systems that each include at least one control arm connected to a respective lower side wall of the front section.

12. The frame arrangement of claim 1 further comprising at least one battery positioned above the side members.

13. A frame arrangement for a vehicle, the frame arrangement comprising:
    first and second longitudinally extending bent side members that each have an upper portion, an offset lower portion and an angled connector portion that connects the upper portion to the lower portion, wherein the upper portions are spaced laterally apart by a first distance, and the lower portions are spaced laterally apart by a second distance less than the first distance;
    multiple storage tanks positioned between the side members, the multiple storage tanks including first and second upper tanks positioned between the upper portions of the side members, and a lower tank positioned between the lower portions of the side members;
    a lower support structure attached to the side members and extending below the side members; and
    at least one battery positioned below the at least one storage tank and supported by the lower support structure.

14. The frame arrangement of claim 13 wherein each of the multiple storage tanks has a cylindrical configuration and comprises a composite material including carbon fibers.

15. The frame arrangement of claim 13 further comprising multiple storage tanks positioned on an outboard side of the first side member and multiple storage tanks positioned on an outboard side of the second side member, wherein the multiple storage tanks positioned on the outboard side of each of the first and second side members comprise first and second lower cylindrical tanks and an upper cylindrical tank that extends above the first and second lower cylindrical tanks so that the first and second lower cylindrical tanks and the upper cylindrical tank form a triangular configuration viewed in cross-section, and wherein each upper cylindrical tank is positioned adjacent the upper portion of a respective side member.

16. The frame arrangement of claim 15 wherein the side members are configured to extend forward of rear wheels of the vehicle when the frame arrangement is used with the vehicle, and wherein the frame arrangement further comprises first and second longitudinally extending rear members attached to the first and second side members, respectively, each rear member including a main body having a top surface that is positioned beneath a top surface of each side member so that height of a rear portion of the frame arrangement is lower than height of a front portion of the frame arrangement to thereby facilitate connection of the frame arrangement to a trailer.

17. The frame arrangement of claim 16 further comprising a front section connected to the side members and that extends forward of the side members, the front section including first and second upper side walls that are connected to the upper portions of the first and second side members, respectively, and first and second lower side walls that are offset inwardly relative to the first and second upper side walls, respectively, and wherein the frame arrangement further comprises first and second suspension systems that each include at least one control arm connected to a respective lower side wall of the front section.

18. The frame arrangement of claim 17 wherein each side member has multiple openings to reduce weight of the side member.

19. A frame arrangement for a vehicle, the frame arrangement comprising:
- first and second longitudinally extending side members that each have an upper portion and a lower portion, wherein the upper portions are spaced laterally apart by a first distance, and the lower portions are spaced laterally apart by a second distance less than the first distance;
- at least one storage tank or battery positioned between the side members;
- a lower support structure attached to the side members and extending below the side members; and
- at least one battery supported by the lower support structure.

20. The frame arrangement of claim 19 wherein the side members are configured to extend forward of rear wheels of the vehicle when the frame arrangement is used with the vehicle, and wherein the frame arrangement further comprises first and second longitudinally extending rear members attached to the first and second side members, respectively, each rear member including a main body having a top surface that is positioned beneath a top surface of each side member so that height of a rear portion of the frame arrangement is lower than height of a front portion of the frame arrangement to thereby facilitate connection of the frame arrangement to a trailer.

* * * * *